United States Patent
Lu et al.

(10) Patent No.: US 8,903,395 B2
(45) Date of Patent: Dec. 2, 2014

(54) MOBILE STATION REATTACHING METHOD, SYSTEM, GATEWAY AND BASE STATION

(75) Inventors: Lei Lu, Shenzhen (CN); Wenliang Liang, Shenzhen (CN); Bojie Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 840 days.

(21) Appl. No.: 12/960,998

(22) Filed: Dec. 6, 2010

(65) Prior Publication Data

US 2011/0077008 A1    Mar. 31, 2011

Related U.S. Application Data

(63) Continuation of application No. PCT/CN2009/072163, filed on Jun. 5, 2009.

(30) Foreign Application Priority Data

Jun. 6, 2008    (CN) .......................... 2008 1 0067712

(51) Int. Cl.
| | | |
|---|---|---|
| H04W 36/00 | (2009.01) | |
| H04W 12/06 | (2009.01) | |
| H04W 48/02 | (2009.01) | |
| H04W 88/08 | (2009.01) | |
| H04W 88/16 | (2009.01) | |

(52) U.S. Cl.
CPC .............. *H04W 12/06* (2013.01); *H04W 36/00* (2013.01); *H04W 48/02* (2013.01); *H04W 88/08* (2013.01); *H04W 88/16* (2013.01)
USPC ....................................................... 455/436

(58) Field of Classification Search
CPC . H04W 36/18; H04W 88/08; H04W 36/0083; H04W 36/06; H04W 36/10; H04W 48/20; H04W 36/08

USPC ............. 455/435.1, 432.1, 435.2, 435.3, 436, 455/440, 443, 411

See application file for complete search history.

(56) References Cited

U.S. PATENT DOCUMENTS

| | | | | |
|---|---|---|---|---|
| 2005/0233749 | A1* | 10/2005 | Karaoguz et al. | 455/442 |
| 2006/0003767 | A1* | 1/2006 | Kim et al. | 455/436 |
| 2008/0125116 | A1* | 5/2008 | Jiang | 455/433 |

FOREIGN PATENT DOCUMENTS

| | | |
|---|---|---|
| CN | 1259264 A | 7/2000 |
| CN | 1640014 A | 7/2005 |

(Continued)

OTHER PUBLICATIONS

"Stage 3: Detailed Protocols and Procedures, Annex: Hooks and Principles for Evolution (informative)," WiMAX Forum Network Architecture, Dec. 28, 2008, Release 1, Version 1.3.1, WiMAX Forum Proprietary, Beaverton, Oregon.

(Continued)

*Primary Examiner* — Kwasi Karikari
(74) *Attorney, Agent, or Firm* — Leydig, Voit & Mayer, Ltd.

(57) ABSTRACT

A mobile station (MS) reattaching method, an MS reattaching system, a gateway, and a base station (BS) are provided. The method includes: determining, according to mobility restriction information, whether an MS is allowed to access a target BS; and if the MS is allowed to access the target BS, returning a handover response (HO_Rsp) indicating that MS reattachment is allowed to the MS. An MS reattaching system, a gateway, and a BS are further provided. An access service network-gateway (ASN-GW) or a serving BS determines, according to mobility restriction information, whether a current target BS is an appropriate target BS to allow the MS to access, so as to satisfy the mobility restriction.

16 Claims, 7 Drawing Sheets

(56) References Cited

FOREIGN PATENT DOCUMENTS

| | | |
|---|---|---|
| CN | 101043736 A | 9/2007 |
| CN | 101052212 A | 10/2007 |
| CN | 101166296 A | 4/2008 |
| EP | 1777977 A1 | 4/2007 |

OTHER PUBLICATIONS

"Stage 3: Detailed Protocols and Procedures, Annex: Prepaid Accounting," WiMAX Forum Network Architecture, Dec. 28, 2008, Release 1, Version 1.3.1, WiMAX Forum Proprietary, Beaverton, Oregon.

"Stage 3: Detailed Protocols and Procedures, R6/R8 ASN Anchored Mobility Scenarios," WiMAX Forum Network Architecture, Dec. 28, 2008, Release 1, Version 1.3.1, WiMAX Forum Proprietary, Beaverton, Oregon.

"Stage 3: Detailed Protocols and Procedures," WiMAX Forum Network Architecture, Dec. 28, 2008, Release 1, Version 1.3.1, WiMAX Forum Proprietary, Beaverton, Oregon.

"Mobility Restriction," Apr. 24, 2008, WiMAX Forum Proprietary, Beaverton, Oregon.

International Search Report from the International Searching Authority in corresponding PCT Application No. PCT/CN2009/072163 (Sep. 10, 2009).

Written Opinion of the International Searching Authority in corresponding PCT Application No. PCT/CN2009/072163 (Sep. 10, 2009).

1st Office Action in corresponding Chinese Application No. 200810067712.X (Dec. 21, 2011).

\* cited by examiner

MOBILE STATION REATTACHING METHOD, SYSTEM, GATEWAY AND BASE STATION

CROSS-REFERENCE TO RELATED APPLICATIONS

This application is a continuation of International Application No. PCT/CN2009/072163, filed on Jun. 5, 2009, which claims priority to Chinese Patent Application No. 200810067712.X, filed on Jun. 6, 2008, both of which are hereby incorporated by reference in their entireties.

FIELD OF THE TECHNOLOGY

The present invention relates to the field of communication, and more particularly to a mobile station (MS) reattaching method, an MS reattaching system, a gateway, and a base station (BS).

BACKGROUND OF THE INVENTION

The Worldwide Interoperability for Microwave Access (WiMAX) is a wireless metropolitan area network (MAN) technology based on the IEEE 802.16 standard. A WiMAX network is mainly formed by three parts, that is, a mobile subscribe station/subscribe station (MSS/SS), an access service network (ASN), and a connectivity service network (CSN). The ASN includes a BS and an ASN-gateway (ASN-GW). The CSN includes a prepaid server (PPS), an authentication, authorization and accounting server (AAA server), and other logical entities.

In the prior art, in order to realize mobility restriction of an MS, the MS users are divided into three categories, namely, fixed users, nomadic users, and mobile users.

A reattaching method for a fixed user or nomadic user when accessing a network is shown in FIG. 1, which includes the following steps.

In step 1, an MS accesses a BS, and requests a relevant service.

In step 2, the BS requests a BS controller (BSC) to authenticate the MS user, and meanwhile transfers a BS identifier (BSID) and a reattachment zone of the BS.

In step 3, the BSC queries MS user associated information through an AAA server.

In step 4, the AAA server sends MS user subscription information to the BSC. The MS user subscription information includes mobility restriction information and information indicating whether the MS user (the MS user is a fixed user/nomadic user) needs to maintain session continuity.

In step 5, upon successful authentication, the BSC notifies the BS of the successful authentication and performing session establishment.

In step 6, the BS completes the session establishment and notifies the MS of successful network access.

In the implementation of the present invention, the inventor(s) found that the prior art at least has the following problem. Currently, in the reattachment of an MS, the BS accessed by the MS is not restricted during the handover process, so that the requirements for mobility restriction of the MS cannot be satisfied.

SUMMARY OF THE INVENTION

Accordingly, the present invention is directed to an MS reattaching method, an MS reattaching system, a gateway, and a BS, which are applicable to solve the problem in the prior art that the BS accessed by the MS is not restricted during the reattachment of the MS, so as to meet the requirement for mobility restriction of the MS.

In an embodiment, the present invention provides an MS reattaching method, which includes the following steps.

It is determined, according to mobility restriction information, whether an MS is allowed to access a target BS, and if the MS is allowed to access the target BS, a handover response (HO_Rsp) indicating that MS reattachment is allowed is returned to the MS.

In an embodiment, the present invention provides a BS, which includes a determination unit and a notification unit.

The determination unit is configured to determine, according to mobility restriction information, whether an MS is allowed to access a target BS. The notification unit is configured to return an HO_Rsp to the MS, where if the determination unit determines that the MS is allowed to access the target BS, the HO_Rsp indicates that MS reattachment is allowed.

In an embodiment, the present invention provides a gateway, which includes a receiving unit, a determination unit, and a notification unit. The receiving unit is configured to receive a handover request (HO_Req), in which the HO_Req contains a serving BS ID and a target BS ID. The determination unit is configured to determine, according to mobility restriction information, whether an MS is allowed to access a target BS. The notification unit is configured to return an HO_Rsp to the MS, where if the determination unit determines that the MS is allowed to access the target BS, the HO_Rsp indicates that MS reattachment is allowed; if the determination unit determines that the MS is not allowed to access the target BS, the HO_Rsp indicates that MS reattachment is rejected.

In an embodiment, the present invention provides an MS reattaching system, which includes a BS and an authenticator ASN. The BS is configured to receive an HO_Req containing a target BS ID sent by an MS, and send a context request (context_req) to the authenticator ASN. The authenticator ASN is configured to determine, according to mobility restriction information, whether the MS is allowed to access a target BS, and return an HO_Rsp to the MS, where if the MS is allowed to access the target BS, the HO_Rsp indicates that MS reattachment is allowed; if the MS is not allowed to access the target BS, the HO_Rsp indicates that MS reattachment is rejected.

In an embodiment, the present invention provides an MS reattaching system, which includes a BS communicatively connected to an MS. The BS is configured to determine, according to mobility restriction information, whether the MS is allowed to access a target BS, and return an HO_Rsp to the MS, where if the MS is allowed to access the target BS, the HO_Rsp indicates that MS reattachment is allowed; if the MS is not allowed to access the target BS, the HO_Rsp indicates that MS reattachment is rejected.

As seen from the above technical solutions, in the embodiments of the present invention, it is determined, according to mobility restriction information, whether an MS is allowed to access a target BS, and if the MS is allowed to access the target BS, an HO_Rsp indicating that MS reattachment is allowed is returned to the MS, which satisfies the mobility restriction for the MS by determining whether the target BS meets a reattachment condition.

DETAILED DESCRIPTION OF THE EMBODIMENTS

Figure 1:
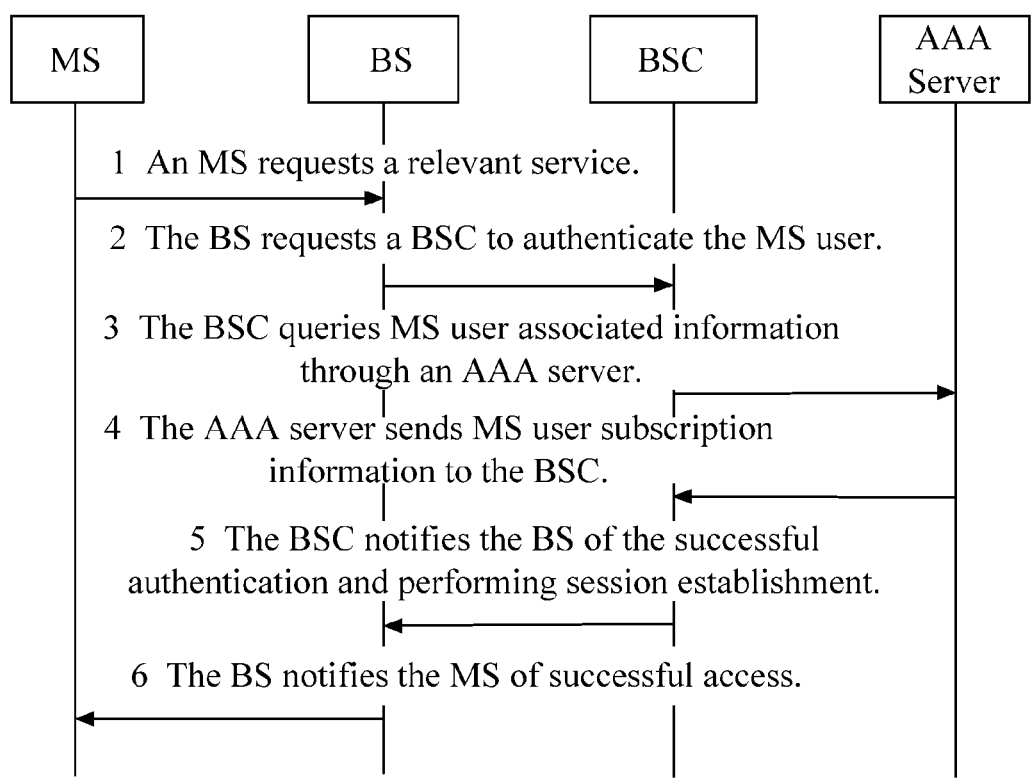
FIG. 1 is a schematic flow chart of a method for accessing a network by a fixed user/nomadic user in the prior art.

An MS reattaching method, an MS reattaching system, a gateway, and a BS are provided in the embodiments of the present invention.

In the embodiments of the present invention, it is determined, according to mobility restriction information, whether an MS is allowed to access a target BS, and if the MS is allowed to access the target BS, an HO_Rsp indicating that MS reattachment is allowed is returned to the MS.

Through the embodiments of the present invention, it is determined, according to mobility restriction information, whether an MS is allowed to access a target BS, and the MS is allowed to access the target BS when a condition is satisfied, which meets the requirement for mobility restriction of the MS.

In the embodiments of the present invention, when it is determined, according to the mobility restriction information, that the MS is not allowed to access the target BS, an HO_Rsp indicating that MS reattachment is rejected is returned to the MS.

Through the above embodiments, when the MS is not allowed to access the target BS, the MS reattachment is rejected, which further meets the requirement for the mobility restriction of the MS.

The mobility restriction information may be BS's reattachment zone information, or may further be BS's reattachment zone information and the MS's permitted entry zone information.

When the mobility restriction information is the reattachment zone information of the BS, in the embodiments of the present invention, it is determined, according to the BS's reattachment zone information, whether the target BS is in the same reattachment zone as a serving BS, and if the target BS is in the same reattachment zone as the serving BS, the MS is allowed to access the target BS, and an HO_Rsp indicating that MS reattachment is allowed is returned to the MS.

When the mobility restriction information is the BS's reattachment zone information and the MS's permitted entry zone information, in the embodiments of the present invention, it is determined, according to the BS's reattachment zone information, whether the target BS is in the same reattachment zone as a serving BS, and it is determined, according to the MS's permitted entry zone information, whether the target BS is in the MS's permitted entry zone, and if the target BS is in the same reattachment zone as the serving BS and the target BS is in the MS's permitted entry zone, the MS is allowed to access the target BS, and an HO_Rsp indicating that MS reattachment is allowed is returned to the MS.

In the embodiments of the present invention, if the target BS is not in the same reattachment zone as the serving BS or the target BS is not in the MS's permitted entry zone, the MS is not allowed to access the target BS, and an HO_Rsp indicating that MS reattachment is rejected is returned to the MS.

Before determining, according to the BS's reattachment zone information, whether the target BS is in the same reattachment zone as the serving BS, or before determining, according to the BS's reattachment zone information, whether the target BS is in the same reattachment zone as the serving BS, and determining, according to the MS's permitted entry zone information, whether the target BS is in the MS's permitted entry zone, the embodiments of the present invention further include receiving an HO_Req sent by the MS or the BS. The HO_Req contains a target BS ID, which may further contain a serving BS ID.

The specific implementations of the present invention are illustrated as follows by taking the determining, by an authenticator ASN of an ASN-GW and according to the BS's reattachment zone information and the serving MS's permitted entry zone information, whether an MS is allowed to access a target BS as the mobility restriction information, as an example.

In the embodiments of the present invention, the ASN-GW or a serving BS determines, according to the BS's reattachment zone information maintained by the ASN-GW or serving BS itself, or according to the BS's reattachment zone information and the MS's permitted entry zone information that are maintained by the ASN-GW or serving BS itself, whether a current target is an appropriate target BS and whether the MS is allowed to access the target BS, so as to satisfy the mobility restriction.

The specific implementations of the embodiments of the present invention are further illustrated in detail as follows with reference to the accompanying drawings.

Figure 2:
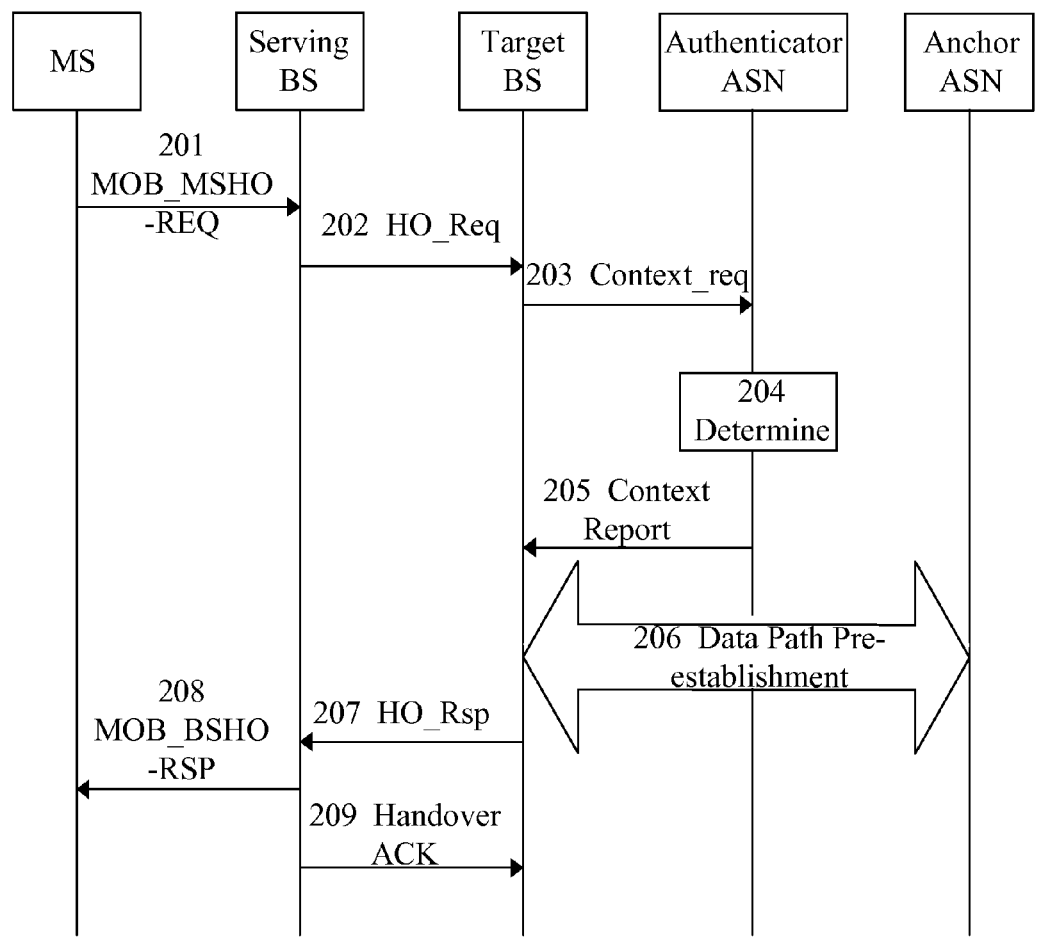
FIG. 2 is a flow chart of an MS reattaching method according to a first embodiment of the present invention.

FIG. 2 is a flow chart of an MS reattaching method according to a first embodiment of the present invention. In this embodiment, when an MS enters a handover preparation phase, it is determined, according to the BS's reattachment zone information and the MS's permitted entry zone information maintained by an authenticator ASN itself, whether the MS is allowed to access a target BS due to mobility restriction. The method specifically includes the following steps.

In step 201, the MS sends a mobile station handover request (MOB_MSHO-REQ) message to a serving BS to initiate a handover process. The message may contain one or more target BSs.

In step 202, the serving BS sends an R4 HO_Req message to the target BS. The message contains the MS's context information. The MS's context information includes an authenticator ID of the MS and an anchor ASN-GW ID of the MS. The authenticator ID indicates an authenticator/key distributor located in the authenticator ASN, and the anchor ASN-GW ID indicates an anchor data path function (anchor DPF) located in an anchor ASN.

When the MOB_MSHO-REQ message sent by the MS in step 201 contains a plurality of target BSs, the serving BS sends the R4 HO_Req message to the plurality of target BSs.

In step 203, the target BS sends a context_req message to the authenticator ASN. The message contains a current serving BS ID and a target BS ID.

In step 204, the authenticator ASN determines, according to the BS's reattachment zone information the maintained by the authenticator ASN itself, whether the target BS is in the same reattachment zone as the serving BS, and determines, according to the MS's permitted entry zone information, whether the target BS is in the MS's permitted entry zone.

In step 205, the authenticator ASN sends a context report message to the target BS. If the target BS is in the MS's permitted entry zone and the target BS is in the same reattachment zone as the serving BS, the sent context report message contains an authorization key (MS AK); if the target BS is not in the MS's permitted entry zone or the target BS is not in the same reattachment zone as the serving BS, the message contains a corresponding error code to indicate that the MS is not allowed to access the target BS due to the mobility restriction. In steps 204 and 205, the authenticator ASN may merely determine, according to the BS's reattachment zone information maintained by the authenticator ASN itself, whether the target BS is in the same reattachment zone as the serving BS, and if the target BS is in the same reattachment zone as the serving BS, the sent context report message contains an MS AK; if the target BS is not in the same reattachment zone as the serving BS, the message contains a corresponding error code to indicate that the MS is not allowed to access the target BS due to the mobility restriction.

In order to realize the mobility restriction for the MS, the error code of failure indication in the context report message may be defined as listed in Table 1.

TABLE 1

| | |
|---|---|
| Type | 69 |
| Length in octets | 1 byte |
| Value | 0 = Unspecified Error |
| | Error Codes: 1-15 Message Header Failure Codes |
| | 1 = Incompatible Version Number |
| | 2 = Invalid Function Type |
| | 3 = Invalid Message Type |
| | 4 = Unknown MSID |
| | 5 = Transaction Failure |
| | 6 = Unknown Source Identifier |
| | 7 = Unknown Destination Identifier |
| | 8 = Invalid Message Header |
| | 9-15 = Reserved for Future Use |
| | Error Codes: 16-31 General Message Body Failure Codes |
| | 16 = Invalid message format |
| | 17 = Mandatory TLV missing |
| | 18 = TLV Value Invalid |
| | 19 = Unsupported Options |
| | 20-31 = Reserved for Future Use |
| | Error Codes: 32-47 Message Generic Failure Codes |
| | 32 = Timer expired without response |
| | 33-47 = Reserved for Future Use |
| | Error Codes: 48-127 Message Specific Failure Codes |
| | 48 = Requested Context Unavailable |
| | 49 = Authorization Failure |
| | 50 = Registration Failure |
| | 51 = No Resources |
| | 52 = Failure by rejection of MS |
| | 53 = Authenticator relocated |
| | 54 = Mobility restriction for fixed and Nomadic user |
| | 55-127 = Reserved for Future Use |
| | (To be updated with sub section team specific error handling) |
| | Error codes: 128-254 are reserved for future use. |
| | Error Code 255 is reserved to indicate use of an error extension field. |
| Description | Indicates the reason for failure of a previous request message Failure indication should be the First TLV in a response message when it is failure for the request message. |
| Parent TLV | None |

In step 206, if the MS's context information acquired by the target BS is available, the target BS may initiate a data path pre-establishment process with the anchor ASN, and if the context report message contains the corresponding error code, this step is not performed.

In step 207, the target BS sends an R4 HO_Rsp message to the serving BS as a reply to the HO_Req. The definition of the R4 HO_Rsp message may be shown in Table 2.

TABLE 2

| | | |
|---|---|---|
| >BS HO RSP Code | 5.3.2.203 | 0: success |
| | | 1: Target BS does not support this HO Type; |
| | | 2: Target BS rejects for other reasons. |
| | | 3: Target BS does not belong to the same reattachment zone |
| | | 4: Target BS does not belong to the permitted entry zone |
| | | 5-255: Reserved |

In step 208, upon receiving the R4 HO_Rsp message, the serving BS sends to the MS a base station handover response (MOB_BSHO-RSP) message. The message may contain one or more target BS IDs where the handover can be realized that are selected by the network for the MS or a corresponding error code to indicate the reason why the current reattachment is not accepted.

As shown in Table 3, error code fields (error code TLV) are added to the MOB_BSHO-RSP message, which indicate the reason why the reattachment is not accepted. The definition of the error code is shown in Table 4.

TABLE 3

| Type | Length | Value |
|---|---|---|
| TBD | 1 | Error-Code |

TABLE 4

| Error code | Description |
|---|---|
| 0 | ALL |
| 1 | Mobility Restriction for different reattachment zones |
| 2 | Mobility Restriction for different entry permitted zones |
| 3-255 | Reserved |

In step 209, the serving BS sends an R4 handover acknowledgement (ACK) message to the target BS.

Figure 3:
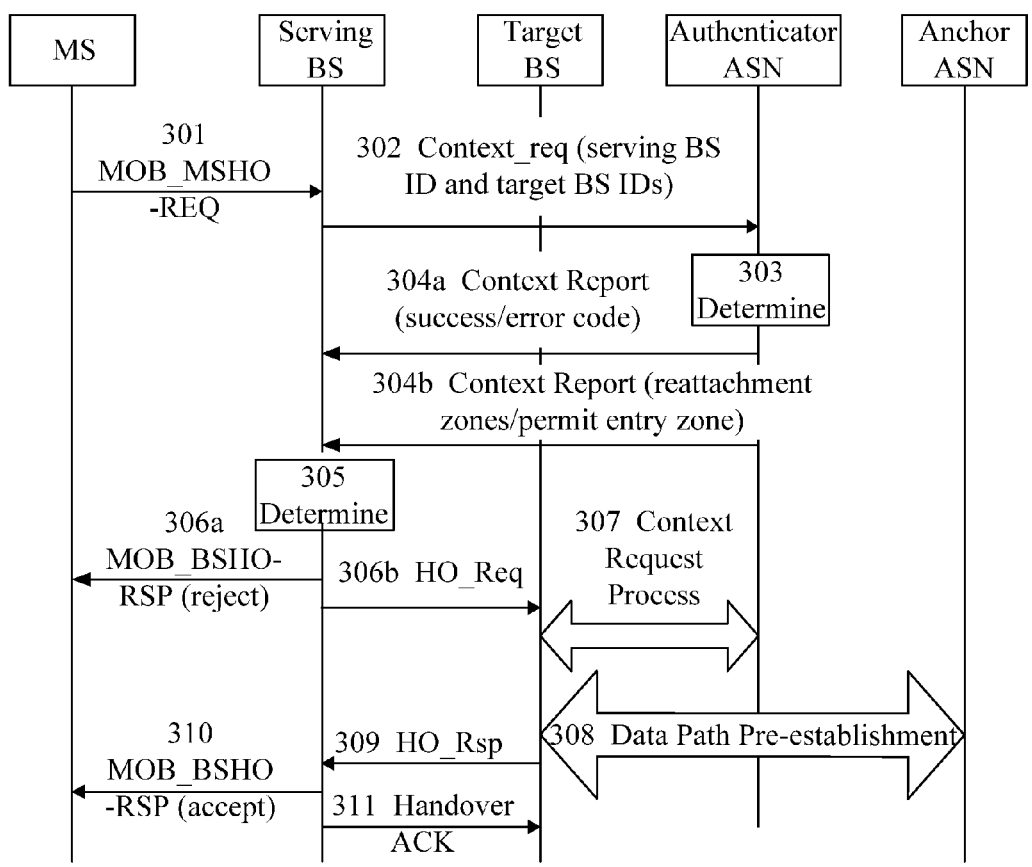
FIG. 3 is a flow chart of an MS reattaching method according to a second embodiment of the present invention.

FIG. 3 is a flow chart of an MS reattaching method according to a second embodiment of the present invention. In this embodiment, when an MS enters a handover preparation phase, an authenticator ASN determines, according to a serving BS ID and a list of target BS IDs to which the MS is to be handed over that are acquired by the authenticator ASN, as well as the BS's reattachment zone information and the MS's permitted entry zone information maintained by the authenticator ASN itself, whether the MS is allowed to access a target BS due to the mobility restriction. If the authenticator ASN does not make the determination, the BS's reattachment zone information and the MS's permitted entry zone information are sent to a serving BS, and the serving BS makes selection to figure out whether an appropriate target BS exists to allow the MS to access. The method specifically includes the following steps.

In step 301, the MS sends an MOB_MSHO-REQ message to the serving BS to initiate a handover process. The message may contain one target BS or a plurality of possible target BSs.

In step 302, the serving BS sends a context_req message to the authenticator ASN. The message carries the serving BS ID and the list of target BS IDs to which the MS is to be handed over.

In step 303, the authenticator ASN determines, according to the serving BS ID, the list of target BS IDs to which the MS is to be handed over, and the BS's reattachment zone information, whether the target BS is in the same reattachment zone as the serving BS, and determines, according to the MS's permitted entry zone information, whether the target BS is in the MS's permitted entry zone.

In this embodiment, if step 303 is performed, step 304a is performed; if step 303 is not performed, that is, the authenticator ASN does not make the determination, step 304b is performed.

In step 304a, if the target BS is in the MS's permitted entry zone and the target BS is in the same reattachment zone as the serving BS, the authenticator ASN sends a context report message and returns Success, and step 306b is performed; if the target BS is not in the MS's permitted entry zone or the target BS is not in the same reattachment zone as the serving BS, a corresponding error code containing the reason why the current reattachment is not accepted is returned, so as to indicate that the MS handover is not allowed due to the mobility restriction, where the definition of the error code is the same as that in the first embodiment and is not described herein again, and step 306a is performed.

In step 304b, the authenticator ASN sends a context report message to the serving BS. The message contains reattachment zone of BS and the MS's permitted entry zone.

In step 305, the serving BS makes determination, according to the BS's reattachment zone and the MS's permitted entry zone in the received context report message, to select a reattachment zone for the MS. If no appropriate target BS exists, step 306a is performed; if an appropriate target BS exists, step 306b is performed.

In step 306a, the serving BS sends to the MS an MOB_BSHO-RSP message to reject the handover and adds a corresponding error code (the definition of the error code is the same as that in the first embodiment), and the process ends.

In step 306b, the serving BS sends an R4 HO_Req message to one or more target BSs. The message contains the MS's context information.

The MS's context information includes an authenticator ID of the MS and an anchor ASN-GW ID of the MS. The authenticator ID indicates an authenticator/key distributor located in the authenticator ASN, and the anchor ASN-GW ID indicates an anchor DPF located in an anchor ASN.

In step 307, the target BS acquires an MS AK context of the MS through a context request process with the authenticator ASN, and if the R4 HO_Req message does not contain the authenticator ID (which means that the serving ASN is the authenticator ASN), the target BS initiates the context request process with the serving BS to acquire the MS AK context of the MS.

In step 308, if the MS's context information acquired by the target BS is available, the target BS initiates a data path pre-establishment process of the MS with the anchor ASN.

In step 309, the target BS sends an R4 HO_Rsp message to the serving BS as a reply to the HO_Req.

In step 310, upon receiving the R4 HO_Rsp message, the serving BS sends an MOB_BSHO-RSP message to the MS. The message may contain one or more target BSs where the handover can be realized that are selected for the MS.

In step 311, the serving BS sends an R4 handover ACK message to the target BS.

Figure 4:
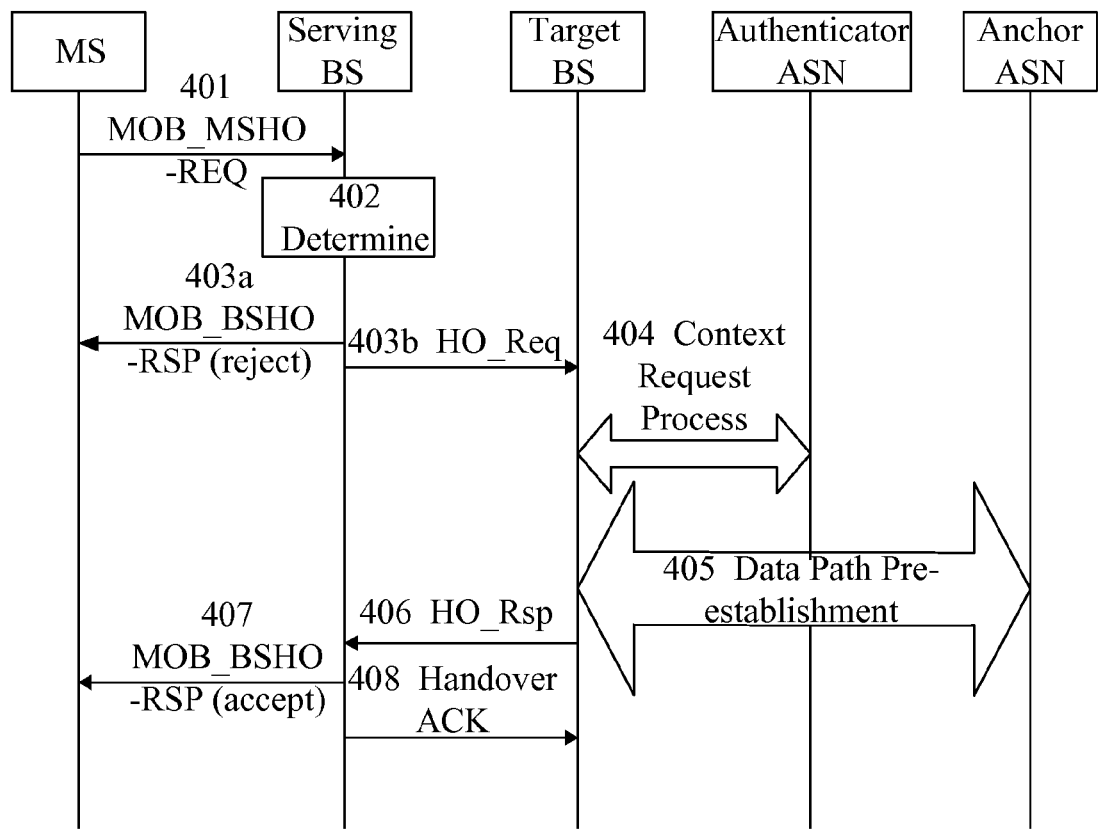
FIG. 4 is a flow chart of an MS reattaching method according to a third embodiment of the present invention.

FIG. 4 is a flow chart of an MS reattaching method according to a third embodiment of the present invention. In this embodiment, when an MS enters a handover preparation phase, a serving BS determines, according to the BS's reattachment zone information and the MS's permitted entry zone information maintained by the serving BS itself, whether an appropriate target BS exists to allow the MS to access. The method specifically includes the following steps.

In step 401, the MS sends an MOB_MSHO-REQ message to the serving BS to initiate a handover process. The message may contain one target BS or a plurality of possible target BSs.

In step 402, the serving BS determines, according to the BS's reattachment zone information maintained by the serving BS itself, whether the target BS is in the same reattachment zone as the serving BS, and determines, according to the MS's permitted entry zone information, whether the target BS is in the MS's permitted entry zone. If the target BS is not in the MS's permitted entry zone or is not in the same reattachment zone as the serving BS, that is, no appropriate target BS exists, step 403a is performed; if any target BS is in the MS's permitted entry zone and is in the same reattachment zone as the serving BS, the appropriate target BS is selected, and step 403b is performed.

In step 403a, the serving BS sends to the MS an MOB_BSHO-RSP message to indicate that the MS is not allowed to access due to the mobility restriction. The message contains a corresponding error code, and the definition of the error code is the same as that in the first embodiment to indicate the reason why the current reattachment is not accepted, and the process ends.

In step 403b, the serving BS sends an R4 HO_Req message to the target BS. The message contains an authenticator ID of the MS and an anchor ASN-GW ID of the MS. The authenticator ID indicates an authenticator/key distributor located in the authenticator ASN, and the anchor ASN-GW ID indicates an anchor DPF located in an anchor ASN.

In step 404, the target BS acquires an MS AK context of the MS through a context request process with the authenticator ASN, and if the R4 HO_Req message does not contain the authenticator ID of the MS (which means that the serving ASN is the authenticator ASN), the target BS initiates the context request process with the serving BS.

In step 405, if the MS's context information acquired by the target BS is available, the target BS initiates a data path pre-establishment process of the MS with the anchor ASN.

In step 406, the target BS sends an R4 HO_Rsp message to the serving BS as a reply to the HO_Req.

In step 407, upon receiving the R4 HO_Rsp message, the serving BS sends an MOB_BSHO-RSP message to the MS. The message may contain one or more target BSs where the handover can be realized that are selected for the MS.

In step 408, the serving BS sends an R4 handover ACK message to the target BS.

In the above three specific implementations, when the MS enters a handover preparation phase, the authenticator ASN or serving BS at the network side determines, according to the BS's reattachment zone information and the MS's permitted entry zone information maintained by the authenticator ASN or serving BS itself, whether the target BS is in the permitted entry zone of the MS and is in the same reattachment zone as the serving BS, and if the target BS is in the MS's permitted entry zone and is in the same reattachment zone as the serving BS, the MS is handed over; if target BS is not in the MS's permitted entry zone or is not in the same reattachment zone as the serving BS, the MS is notified of being not allowed to access due to the mobility restriction, and the current reattachment is not accepted, which meets the requirement for the mobility restriction of fixed users and nomadic user terminals.

Figure 5:
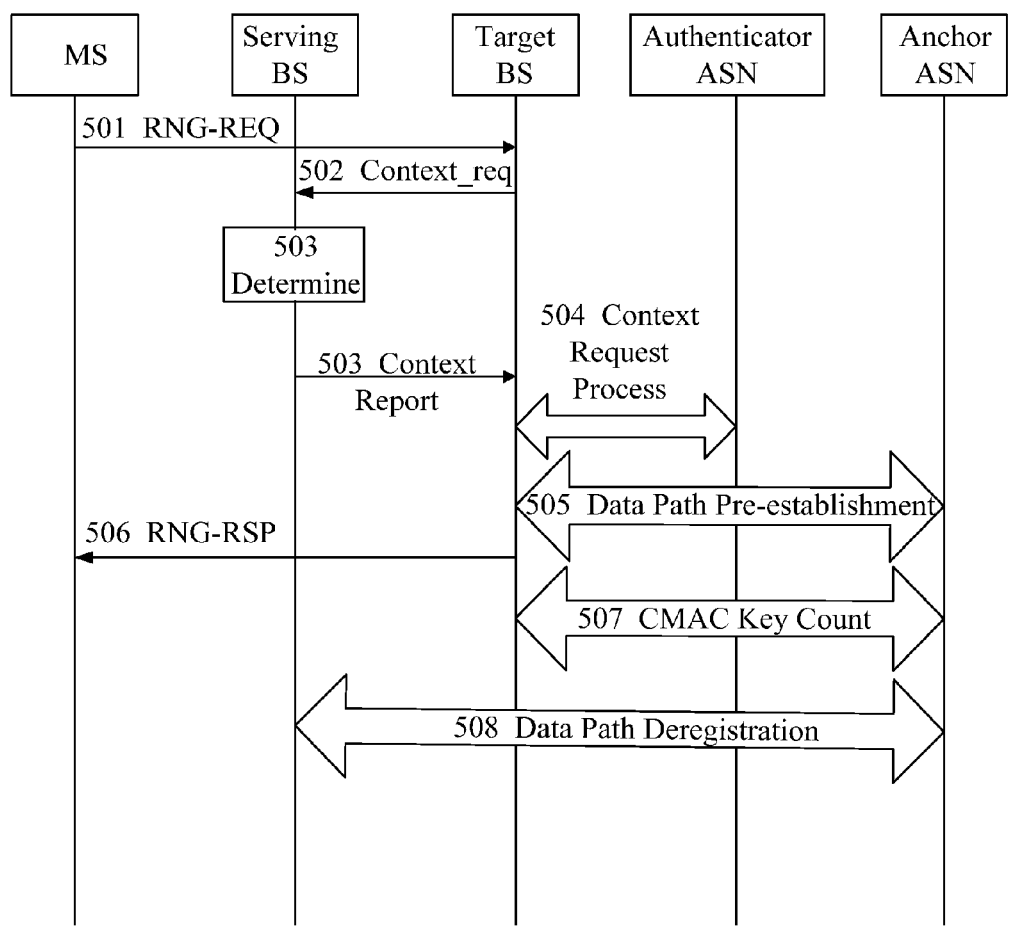
FIG. 5 is a flow chart of an MS reattaching method according to a fourth embodiment of the present invention.

FIG. 5 is a flow chart of an MS reattaching method according to a fourth embodiment of the present invention. In this embodiment, when an MS is handed over without preparation, a serving BS determines, according to the BS's reattachment zone information and the MS's permitted entry zone information maintained by the serving BS itself, whether a target BS allows the MS to access. The method specifically includes the following steps.

In step 501, the MS sends a ranging request (RNG-REQ) message to the target BS to initiate a handover process. The message contains a serving BS ID.

In step 502, the target BS sends a context_req message to the serving BS to acquire the MS's context information. The context_req message contains a target BS ID.

In step 503, the serving BS determines, according to the BS's reattachment zone information, whether the target BS is in the same reattachment zone as the serving BS, and determines, according to the MS's permitted entry zone information, whether the target BS is in the MS's permitted entry zone. If the target BS is in the same reattachment zone as the serving BS and the target BS is in the MS's permitted entry zone, the serving BS sends a context report message to the target BS and returns a context of the MS; if the target BS is not in the same reattachment zone as the serving BS or the target BS is not in the MS's permitted entry zone, the serving BS returns a corresponding error code to indicate that the MS is not allowed to access due to the mobility restriction, where the corresponding error code indicates the reason why the reattachment is not accepted, and step 506 is performed.

In step 504, if the target BS acquires the MS's context information successfully, the target BS acquires an MS AK context of the MS through a context request process with an authenticator ASN of the MS.

In step 505, the target BS initiates a data path establishment process of the MS with an anchor ASN.

In step 506, the target BS sends a ranging response (RNG-RSP) message to the MS. If the corresponding error code is returned in step 503, the RNG-RSP message indicates that the MS is not allowed to access due to the mobility restriction, a corresponding error code is returned to indicate that the MS is not allowed to access due to the mobility restriction, where the corresponding error code indicates the reason why the reattachment is not accepted, and the process ends.

In step 507, the target BS initiates a cipher-based message authentication code key count (CMAC Key Count) update process with the authenticator ASN of the MS.

In step 508, the anchor ASN initiates a data path deregistration process with the serving BS.

In the above specific implementation, when the MS is handed over without preparation, the serving BS determines, according to the BS's reattachment zone information maintained by the serving BS itself, whether the target BS is in the same reattachment zone as the serving BS, and determines, according to the MS's permitted entry zone information, whether the target BS is in the MS's permitted entry zone. If the target BS is in the same reattachment zone as the serving BS and the target BS is in the MS's permitted entry zone, the MS performs the handover and access; if the target BS is not in the same reattachment zone as the serving BS or the target BS is not in the MS's permitted entry zone, the MS is notified of being not allowed to access due to the mobility restriction and the current reattachment is not accepted, which meets the requirement for the mobility restriction of fixed users and nomadic user terminals.

Figure 6:
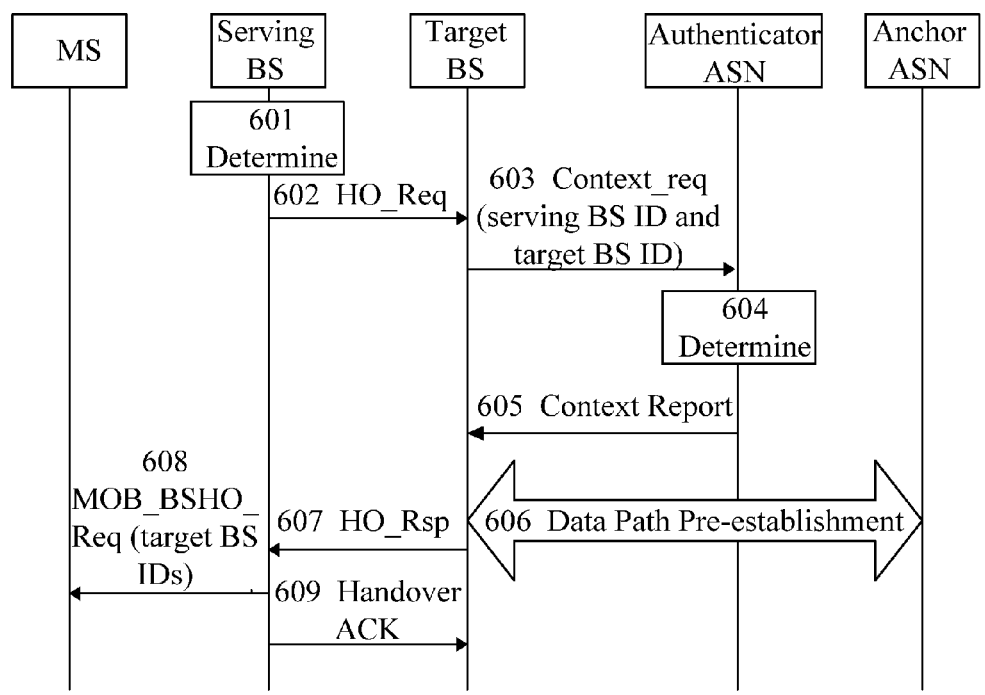
FIG. 6 is a flow chart of an MS reattaching method according to a fifth embodiment of the present invention.

FIG. 6 is a flow chart of an MS reattaching method according to a fifth embodiment of the present invention. A serving BS initiates MS reattachment due to load balance or when detecting that an MS signal becomes deteriorated. In this embodiment, the network side initiates the reattachment, and the serving BS or an authenticator ASN determines, according to the BS's reattachment zone information and the MS's permitted entry zone information that are maintained, whether an appropriate target BS exists to allow an MS to access. Specifically, the serving BS or authenticator ASN may determine whether an appropriate target BS exists to allow access. The method specifically includes the following steps.

In step 601, if the serving BS maintains the BS's reattachment zone information and the MS's permitted entry zone information, the serving BS determines, according to the information, whether an appropriate target BS exists, and if an appropriate target BS exists, the serving BS selects the appropriate target BS; if no appropriate target BS exists, the serving BS continues serving the MS or re-searches for a new appropriate target BS for determination.

In step 602, the serving BS sends an R4 HO_Req message to the target BS. The message contains the MS's context information.

In step 603, the target BS acquires an MS AK context of the MS and meanwhile knows whether the MS performs a relevant reattachment operation through a context_req message with the authenticator ASN of the MS. The request contains a current serving BS ID and a target BS ID.

In step 604, the authenticator ASN determines whether authentication information of the MS is valid.

If the serving BS does not maintain the BS's reattachment zone and the MS's permitted entry zone, step 601 is not performed, and the authenticator ASN determines, according to the BS's reattachment zone information, whether the target BS is in the same reattachment zone as the serving BS, and determines, according to the MS's permitted entry zone information, whether the target BS is in the MS's permitted entry zone. If the serving BS maintains the BS's reattachment zone and the MS's permitted entry zone, the determination is omitted here.

In step 605, if the target BS of the MS is in the MS's permitted entry zone and is in the same reattachment zone as the serving BS, a context report message containing an MS AK context of the MS is sent to the target BS and the AK of the MS is returned; if the target BS of the MS is not in the MS's permitted entry zone or is not in the same reattachment zone as the serving BS, a corresponding error code is returned to indicate that the MS is not allowed to access due to the mobility restriction and indicate the reason why the current reattachment is not accepted, the process ends, and the serving BS continues serving the MS.

In step 606, if the MS's context information acquired by the target BS is available, the target BS initiates a data path pre-establishment process of the MS with an anchor ASN.

In step 607, the target BS sends an R4 HO_Rsp message to the serving BS as a reply to the HO_Req.

In step 608, upon receiving the R4 HO_Rsp message, the serving BS sends a MOB_BSHO_Req message to the MS. The message may contain one or more target BS IDs where the handover can be realized that are selected by the network for the MS.

In step 609, the serving BS sends an R4 handover ACK message to the target BS.

In the above specific implementation, when the serving BS initiates MS reattachment due to load balance or when detecting that an MS signal becomes deteriorated, the serving BS or authenticator ASN determines, according to the BS's reattachment zone information and the MS's permitted entry zone information that are maintained by the serving BS or authenticator ASN itself, whether the target BS is in the MS's permitted entry zone and is in the same reattachment zone as the serving BS, and if the target BS is in the permitted entry zone of the MS and is in the same reattachment zone as the serving BS, the MS performs access; if the target BS is not in the MS's permitted entry zone or is not in the same reattachment zone as the serving BS, the MS is notified of being not allowed to access due to the mobility restriction and the current reattachment is not accepted, which meets the requirement for the mobility restriction of fixed users and nomadic user terminals.

In the above specific implementations, the authenticator ASN and the serving BS determine, according to the BS's reattachment zone information and the permitted entry zone information, whether the target BS is in the MS's permitted entry zone and is in the same reattachment zone as the serving BS. As for a part of nomadic users, the authenticator ASN or serving BS may further determine, according to the BS's reattachment zone information maintained by the authenticator ASN or serving BS itself or reattachment zone information acquired by the serving BS through the authenticator ASN, whether the target BS is in the same reattachment zone as the serving BS, and if the target BS is in the same reattachment zone as the serving BS, an HO_Rsp indicating that MS reattachment is allowed is returned; if the target BS is not in the same reattachment zone as the serving BS, an HO_Rsp indicating that MS reattachment is rejected is returned.

In the above specific implementations, the authenticator ASN of the ASN-GW is taken as an example to illustrate the MS reattaching method. Other entities of the ASN-GW, for example, a context function of the ASN-GW, may also realize the implementation of the present invention in a similar way, which will not be described herein again.

Those of ordinary skill in the art should understand that, all or a part of the steps of the method according to the embodiments may be implemented by a program instructing relevant hardware. The program may be stored in a computer readable storage medium. When the program is executed, the following steps are performed.

It is determined, according to mobility restriction information, whether an MS is allowed to access a target BS, and if the MS is allowed to access the target BS, an HO_Rsp indicating that MS reattachment is allowed is returned to the MS.

The aforementioned storage medium may be a read only memory (ROM), a magnetic disk, or an optical disk.

Figure 7:
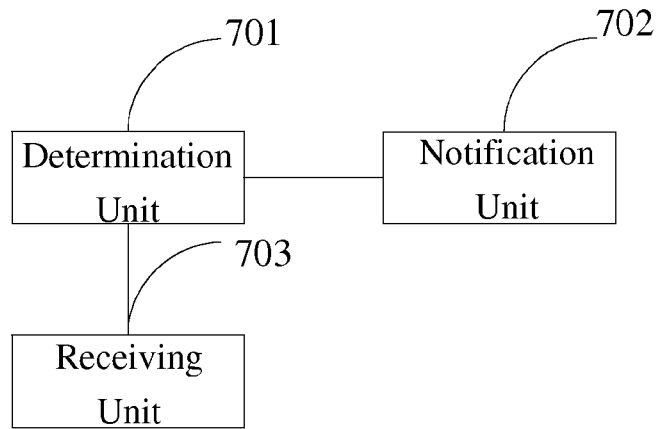
FIG. 7 is a schematic structural view of a BS according to an embodiment of the present invention.

A BS is provided in an embodiment of the present invention, as shown in FIG. 7, which includes a determination unit 701 and a notification unit 702. The determination unit 701 is configured to determine, according to mobility restriction information, whether an MS is allowed to access a target BS. The notification unit 702 is configured to return an HO_Rsp to the MS, where if the determination unit 701 determines that the MS is allowed to access the target BS, the HO_Rsp indicates that MS reattachment is allowed.

The notification unit 702 is further configured to return an HO_Rsp indicating that MS reattachment is rejected, if the determination unit 701 determines that the MS is not allowed to access the target BS.

Specifically, the determination unit 701 determines, according to the BS's reattachment zone information, whether the target BS is in the same reattachment zone as a serving BS, and if the target BS is in the same reattachment zone as the serving BS, the MS is allowed to access the target BS.

The determination unit 701 is further configured to determine, according to the BS's reattachment zone information, whether the target BS is in the same reattachment zone as the serving BS, and determine, according to the MS's permitted entry zone information, whether the target BS is in the MS's permitted entry zone, and if the target BS is in the same reattachment zone as the serving BS and the target BS is in the MS's permitted entry zone, the MS is allowed to access the target BS; if the target BS is not in the same reattachment zone as the serving BS or the target BS is not in the MS's permitted entry zone, the MS is not allowed to access the target BS.

The BS further includes a receiving unit 703. The receiving unit 703 is configured to receive a context report sent by an authenticator ASN, where the context report contains the BS's reattachment zone information. The determination unit 701 determines, according to the BS's reattachment zone information received by the receiving unit 703, whether the target BS is in the same reattachment zone as the serving BS.

The receiving unit 703 is further configured to receive a context report message sent by the authenticator ASN, where the context report message contains the BS's reattachment zone information and the MS's permitted entry zone information. The determination unit 701 determines, according to the BS's reattachment zone information received by the receiving unit 703, whether the target BS is in the same reattachment zone as the serving BS, and determines, according to the MS's permitted entry zone information, whether the target BS is in the MS's permitted entry zone.

Figure 8:
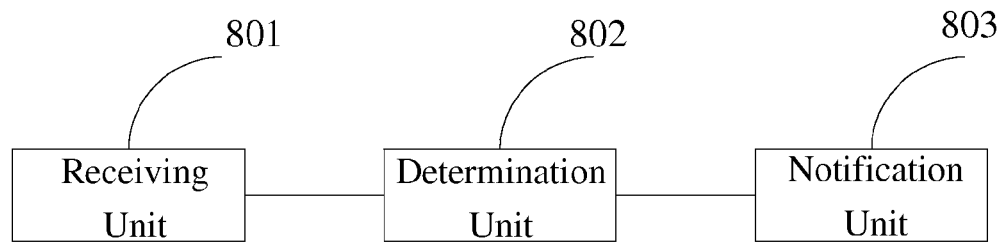
FIG. 8 is a schematic structural view of a gateway according to an embodiment of the present invention.

A gateway is provided in an embodiment of the present invention, as shown in FIG. 8, which includes a receiving unit 801, a determination unit 802, and a notification unit 803. The receiving unit 801 is configured to receive an HO_Req containing a serving BS ID and a target BS ID. The determination unit 802 is configured to determine, according to mobility restriction information, whether an MS is allowed to access a target BS. The notification unit 803 is configured to return an HO_Rsp to the MS, where if the determination unit 802 determines that the MS is allowed to access the target BS, the HO_Rsp indicates that MS reattachment is allowed; if the determination unit 802 determines that the MS is not allowed to access the target BS, the HO_Rsp indicates that MS reattachment is rejected.

Specifically, the determination unit 802 determines, according to the BS's reattachment zone information, whether the target BS is in the same reattachment zone as a serving BS, or determines, according to the BS's reattachment zone information, whether the target BS is in the same reattachment zone as the serving BS, and determines, according to the MS's permitted entry zone information, whether the target BS is in the MS's permitted entry zone, and if the target BS is not in the same reattachment zone as the serving BS or the target BS is not in the MS's permitted entry zone, the MS is not allowed to access the target BS; if the target BS is in the same reattachment zone as the serving BS and the target BS is in the MS's permitted entry zone, the MS is allowed to access the target BS.

The gateway may be specifically an authenticator ASN or a context function.

Figure 9:
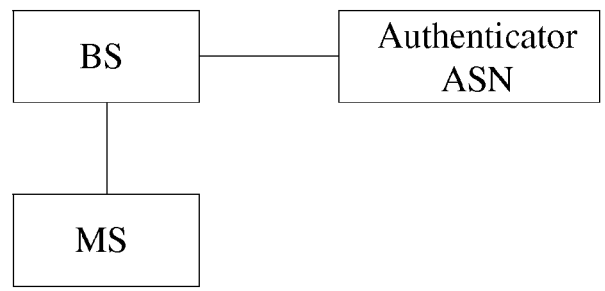
FIG. 9 is a schematic structural view of an MS reattaching system according to an embodiment of the present invention.

An MS reattaching system is provided in an embodiment of the present invention, as shown in FIG. 9, which includes a BS and an authenticator ASN.

The BS is configured to receive an HO_Req containing a target BS ID that is sent by an MS, and send a context_req to the authenticator ASN.

The authenticator ASN is configured to determine, according to mobility restriction information, whether the MS is allowed to access a target BS, and return an HO_Rsp to the MS, where if the MS is allowed to access the target BS, the HO_Rsp indicates that MS reattachment is allowed; if the MS is not allowed to access the target BS, the HO_Rsp indicates that MS reattachment is rejected.

The authenticator ASN determines, according to the mobility restriction information, whether the MS is allowed to access the target BS through the following specific process. That is, the authenticator ASN determines, according to the BS's reattachment zone information, whether the target BS is in the same reattachment zone as a serving BS, or determines, according to the BS's reattachment zone information, whether the target BS is in the same reattachment zone as the serving BS, and determines, according to the MS's permitted entry zone information, whether the target BS is in the MS's permitted entry zone, and if the target BS is not in the same reattachment zone as the serving BS or the target BS is not in the MS's permitted entry zone, the MS is not allowed to access the target BS; if the target BS is in the same reattachment zone as the serving BS and the target BS is in the MS's permitted entry zone, the MS is allowed to access the target BS.

An embodiment of the present invention further provides an MS reattaching system which includes a BS in communication with an MS. The BS is configured to determine, according to mobility restriction information, whether the MS is allowed to access a target BS, and return an HO_Rsp to the MS, where if the MS is allowed to access the target BS, the HO_Rsp indicates that MS reattachment is allowed; if the MS is not allowed to access the target BS, the HO_Rsp indicates that MS reattachment is rejected.

The BS determines, according to the mobility restriction information, whether the MS is allowed to access the target BS, through the following specific process. That is, the BS determines, according to the BS's reattachment zone information, whether the target BS is in the same reattachment zone as a serving BS, or determines, according to the BS's reattachment zone information, whether the target BS is in the same reattachment zone as the serving BS, and determines, according to the MS's permitted entry zone information, whether the target BS is in the MS's permitted entry zone, and if the target BS is not in the same reattachment zone as the serving BS or the target BS is not in the MS's permitted entry zone, the MS is not allowed to access the target BS; if the target BS is in the same reattachment zone as the serving BS and the target BS is in the MS's permitted entry zone, the MS is allowed to access the target BS.

In the embodiments of the present invention, the ASN-GW or serving BS determines, according to the BS's reattachment zone maintained by the ASN-GW or serving BS itself, or according to the BS's reattachment zone information and the MS's permitted entry zone information that are maintained by the ASN-GW or serving BS itself, whether a current target is an appropriate target BS and whether the MS is allowed to access the target BS, and if the MS is not allowed to access the target BS, returns an HO_Rsp indicating that MS reattachment is rejected. The HO_Rsp contains a corresponding error code to the MS, which indicates the reason for the reattachment failure, or indicates that the target BS is not in the same reattachment zone as the serving BS or the target BS is not in the MS's permitted entry zone, so as to satisfy the mobility restriction.

Detailed above are the objectives, technical solution and merits of the present invention. Although the invention has been described through several exemplary embodiments, the invention is not limited to such embodiments. Any modification, equivalent replacement, or improvement made without departing from the spirit and principle of the present invention should fall within the scope of the present invention.

What is claimed is:

1. A mobile station (MS) reattaching method, comprising:
determining, by a serving base station (BS), according to mobility restriction information maintained by the serving BS itself, whether an MS is allowed to access a target base station (BS), and if the MS is allowed to access the target BS, returning to the MS a handover response indicating that MS reattachment is allowed;
wherein the mobility restriction information is one of the group consisting of:
the serving BS's reattachment zone information, and
both the serving BS's reattachment zone information and the MS's permitted entry zone information,
wherein the determining, by the serving BS, according to the mobility restriction information, whether the MS is allowed to access the target BS comprises at least one of the group consisting of:
determining, by the serving BS, according to the BS's reattachment zone information, whether the target BS is in the same reattachment zone as a serving BS, and allowing the MS to access the target BS if the target BS is in the same reattachment zone as the serving BS; and
determining, by the serving BS, according to the BS's reattachment zone information, whether the target BS is in the same reattachment zone as a serving BS, and determining, according to the MS's permitted entry zone information, whether the target BS is in the MS's permitted entry zone, and allowing the MS to access the target BS if the target BS is in the same reattachment zone as the serving BS and is in the MS's permitted entry zone.

2. The method according to claim 1, further comprising:
returning to the MS a handover response indicating that MS reattachment is rejected if the target BS is not in the same reattachment zone as the serving BS or the target BS is not in the MS's permitted entry zone.

3. The method according to claim 1, wherein
before the determining, by the serving BS, according to the BS's reattachment zone information, whether the target BS is in the same reattachment zone as the serving BS, or the determining, according to the BS's reattachment zone information, whether the target BS is in the same reattachment zone as the serving BS, and determining, according to the MS's permitted entry zone information, whether the target BS is in the MS's permitted entry zone, the method further comprises:
receiving, by an authenticator access service network (ASN), a context request containing a target BS identifier (ID) sent from the serving BS or the target BS.

4. The method according to claim 3, wherein the context request further contains a serving BS ID.

5. The method according to claim 1, wherein
before the determining, by the serving BS, according to the BS's reattachment zone information, whether the target BS is in the same reattachment zone as the serving BS, or the determining, according to the BS's reattachment zone information, whether the target BS is in the same reattachment zone as the serving BS, and determining, according to the MS's permitted entry zone information, whether the target BS is in the MS's permitted entry zone, the method further comprises:
receiving, by the serving BS, a handover request containing a target BS ID sent from the MS.

6. The method according to claim 1, wherein
before the determining, by the serving BS, according to the BS's reattachment zone information, whether the target BS is in the same reattachment zone as the serving BS, the method further comprises:

receiving, by the serving BS, a context report sent by an authenticator ASN, wherein the context report contains the BS's reattachment zone information.

7. The method according to claim 1, wherein
before the determining, by the serving BS, according to the BS's reattachment zone information, whether the target BS is in the same reattachment zone as the serving BS, and determining, according to the MS's permitted entry zone information, whether the target BS is in the MS's permitted entry zone, the method further comprises:

receiving, by the serving BS, a context report sent by an authenticator ASN, wherein the context report contains the BS's reattachment zone information and the MS's permitted entry zone information.

8. The method according to claim 1, wherein
before the determining, by the serving BS, according to the BS's reattachment zone information, whether the target BS is in the same reattachment zone as the serving BS, or the determining, according to the BS's reattachment zone information, whether the target BS is in the same reattachment zone as the serving BS and determining, according to the MS's permitted entry zone information, whether the target BS is in the MS's permitted entry zone, the method further comprises:

receiving, by the target BS, a ranging request sent by the MS, wherein the ranging request contains a serving BS ID; and sending, by the target BS, a context request to the serving BS, wherein the context request contains a target BS ID.

9. The method according to claim 8, further comprising:
receiving, by the target BS, a context report sent by the serving BS; and
sending, by the target BS, a ranging response to the MS.

10. The method according to claim 1, wherein before the returning the handover response to the MS, the method further comprises:

sending, by the serving BS, a context request to an authenticator ASN, wherein the context request contains a serving BS ID and a target BS ID.

11. A base station (BS), comprising a determination unit and a notification unit, wherein the determination unit is configured to determine, according to mobility restriction information maintained by the BS itself, whether a mobile station (MS) is allowed to access a target BS;

wherein the notification unit is configured to return a handover response to the MS, and if the determination unit determines that the MS is allowed to access the target BS, the handover response indicates that MS reattachment is allowed; and wherein the mobility restriction information is one of the group consisting of:
the BS's reattachment zone information,
both the BS's reattachment zone information and the MS's permitted entry zone information, and
wherein the determination unit is further configured to determine, according to the BS's reattachment zone information, whether the target BS is in the same reattachment zone as a serving BS, and if the target BS is in the same reattachment zone as the serving BS, the MS is allowed to access the target BS.

12. The BS according to claim 11, further comprising a receiving unit, wherein the receiving unit is configured to receive a context report containing the BS's reattachment zone information sent by an authenticator access service network (ASN), and the determination unit determines, according to the BS's reattachment zone information received by the receiving unit, whether the target BS is in the same reattachment zone as the serving BS.

13. The BS according to claim 12, wherein
the receiving unit is configured to receive a context report message containing the BS's reattachment zone information and the MS's permitted entry zone information sent by the authenticator ASN, and the determination unit determines, according to the BS's reattachment zone information received by the receiving unit, whether the target BS is in the same reattachment zone as the serving BS, and determines, according to the MS's permitted entry zone information, whether the target BS is in the MS's permitted entry zone.

14. A base station (BS) comprising a determination unit and a notification unit, wherein the determination unit is configured to determine, according to mobility restriction information maintained by the BS itself, whether a mobile station (MS) is allowed to access a target BS;

wherein the notification unit is configured to return a handover response to the MS, and if the determination unit determines that the MS is allowed to access the target BS, the handover response indicates that MS reattachment is allowed; and wherein the mobility restriction information is one of the group consisting of:
the BS's reattachment zone information,
both the BS's reattachment zone information and the MS's permitted entry zone information, and
wherein the determination unit is further configured to determine, according to the BS's reattachment zone information, whether the target BS is in the same reattachment zone as a serving BS and determine, according to the MS's permitted entry zone information, whether the target BS is in the MS's permitted entry zone, and if the target BS is in the same reattachment zone as the serving BS and the target BS is in the MS's permitted entry zone, the MS is allowed to access the target BS; if the target BS is not in the same reattachment zone as the serving BS or the target BS is not in the MS's permitted entry zone, the MS is not allowed to access the target BS.

15. A gateway, comprising a receiving unit, a determination unit, and a notification unit, wherein
the receiving unit is configured to receive a handover request containing a serving base station (BS) identifier (ID) and a target BS ID;
the determination unit is configured to determine, according to mobility restriction information, whether a mobile station (MS) is allowed to access a target BS; and
the notification unit is configured to return a handover response to the MS, and if the determination unit determines that the MS is allowed to access the target BS, the handover response indicates that MS reattachment is allowed; if the determination unit determines that the MS is not allowed to access the target BS, the handover response indicates that MS reattachment is rejected;
the mobility restriction information is the serving BS's reattachment zone information, or the serving BS's reattachment zone information and the MS's permitted entry zone information.

16. The gateway according to claim 15, wherein
the determination unit is further configured to determine, according to the BS's reattachment zone information, whether the target BS is in the same reattachment zone as a serving BS, or determine, according to the BS's reattachment zone information, whether the target BS is in the same reattachment zone as a serving BS, and determine, according to the MS's permitted entry zone information, whether the target BS is in the MS's permitted entry zone, and if the target BS is not in the same reattachment zone as the serving BS or the target BS is not in the MS's permitted entry zone, the MS is not allowed to access the target BS; if the target BS is in the same reattachment zone as the serving BS and the target BS is in the MS's permitted entry zone, the MS is allowed to access the target BS.

* * * * *